(12) United States Patent
Yoo et al.

(10) Patent No.: US 7,466,904 B2
(45) Date of Patent: Dec. 16, 2008

(54) APPARATUS AND METHOD FOR PROCESSING IMAGE DATA IN AN INTERACTIVE MEDIA PLAYER

(75) Inventors: Jea Yong Yoo, Seoul (KR); Woo Seong Yoon, Namyangjoo-si (KR); Limonov Alexandre, Seoul (KR)

(73) Assignee: LG Electronics, Inc., Seoul (KR)

( * ) Notice: Subject to any disclaimer, the term of this patent is extended or adjusted under 35 U.S.C. 154(b) by 809 days.

(21) Appl. No.: 10/671,091

(22) Filed: Sep. 25, 2003

(65) Prior Publication Data

US 2004/0184766 A1 Sep. 23, 2004

(30) Foreign Application Priority Data

Mar. 17, 2003 (KR) .................... 10-2003-0016629

(51) Int. Cl.
*H04N 5/00* (2006.01)
*H04N 5/91* (2006.01)
*H04N 7/00* (2006.01)

(52) U.S. Cl. ................... 386/125; 386/46; 386/126
(58) Field of Classification Search ............... 386/46, 386/125–126
See application file for complete search history.

(56) References Cited

U.S. PATENT DOCUMENTS

| | | | |
|---|---|---|---|
| 5,539,430 A * | 7/1996 | Priem et al. ............... 345/545 |
| 6,580,870 B1 * | 6/2003 | Kanazawa et al. ........... 386/95 |
| 6,993,199 B2 * | 1/2006 | Chebil ........................ 382/240 |
| 2002/0030652 A1 * | 3/2002 | Shibata et al. ................ 345/87 |
| 2002/0180764 A1 * | 12/2002 | Gilbert et al. ............... 345/660 |

FOREIGN PATENT DOCUMENTS

| | | | |
|---|---|---|---|
| EP | 0921461 A2 * | 2/1998 |
| EP | 0921461 A2 | 6/1999 |
| EP | 1310906 A1 | 5/2003 |
| JP | 11161664 A | 6/1999 |
| JP | 2000-075845 | 3/2000 |
| JP | 2001-175236 | 6/2001 |

* cited by examiner

Primary Examiner—Thai Tran
Assistant Examiner—Daquan Zhao
(74) Attorney, Agent, or Firm—Birch, Stewart, Kolasch & Birch, LLP

(57) ABSTRACT

An interactive media player is provided. The player comprises a storage unit for storing a plurality of image sources read from a recording medium, each image source having a respective bit depth; a decoder for decoding the plurality of image sources, confirming the respective bit depths of the image sources, and determining whether or not the confirmed bit depths are to be converted to another bit depth; and a converter for converting at least one of the respective bit depths into another bit depth.

23 Claims, 4 Drawing Sheets

| Name | Description | Attribute | Bytes | Value |
|---|---|---|---|---|
| IHDR | Image header | Width | 4B | 0 to 720 |
| | | Height | 4B | 0 to 480 (576) |
| | | Bit depth | 1B | 1,2,4,8 |
| | | Color type | 1B | 0,2,3,4,6 |
| | | Compression method | 1B | 0x00 |
| | | Filter method | 1B | 0x00 |
| | | Interlace method | 1B | 0x00 |
| PLTE | Palette | - | Max (256x3)B | 0 to 255 |
| IDAT | Image data | - | - | - |
| IEND | Image trailer | - | 0B | - |

APPARATUS AND METHOD FOR PROCESSING IMAGE DATA IN AN INTERACTIVE MEDIA PLAYER

CROSS-REFERENCE TO RELATED APPLICATIONS

Pursuant to 35 U.S.C. § 119(a), this application claims the benefit of earlier filing date and right of Korean Patent Application No. 10-2003-16629, filed on Mar. 17, 2003, the content of which is hereby incorporated by reference herein in its entirety.

BACKGROUND OF THE INVENTION

1. Field of the Invention

The present invention relates to an apparatus and method for processing image data in an interactive media player, and more particularly to an apparatus and method for equalizing bit depths of pixels according to a predetermined hardware specification while processing additional image data.

2. Description of the Related Art

High-density optical discs (e.g., digital versatile discs (DVDs)) are capable of recording and storing digital data. The DVDs are high-capacity recording mediums capable of permanently recording and storing not only high-quality digital audio data, but also high-quality moving picture data.

A DVD includes (1) a data stream recording area for recording a digital data stream, such as moving picture data, and (2) a navigation data recording area for recording navigation data needed for controlling playback of the moving picture data.

Thus, a general DVD player first reads the navigation data recorded on the navigation data recording area if the DVD is seated in the player, stores the read navigation data in a memory provided in the player, and reproduces the moving picture data recorded on the data stream recording area using the navigation data. The DVD player reproduces the moving picture data recorded on the DVD, such that a user can see and hear a movie recorded on the DVD.

Additional contents (control or additional information, i.e., enhanced navigation data) associated with the playback of audio/video (A/V) data are recorded on the DVD in form of a file written in a hypertext markup language (HTML). Standardization work of an interactive digital versatile disc (I-DVD or Enhanced Digital Versatile Disc (eDVD)) is ongoing. The A/V data recorded on the I-DVD is reproduced according to the user's interactive request. Based on a current provisional standard of the I-DVD, the ENAV data can be received from an external server instead of the I-DVD, and can be reproduced in association with the A/V data recorded on the I-DVD. Where I-DVDs are commercialized, the supply of contents through digital recording mediums will be more prevalent.

The ENAV data is comprised of a variety of files (e.g., html files, image files, sound files, and moving picture files). Image data (containing animation data) from among the ENAV data may be formed to have a variety of bit depths for every pixel (under a monochrome signal) or color.

However, because an I-DVD player uses only one unit (application, video memory, or hardware, etc.) for processing image data, it will be preferable for the I-DVD player to control the image data at only one fixed bit depth, resulting in easier hardware implementation and superior display performance of the I-DVD player. Therefore, it is necessary for the I-DVD player to effectively process image data created at various bit depths.

SUMMARY OF THE INVENTION

A method for processing image data in an interactive media player is provided. The method comprising receiving a plurality of image sources from at least one of an interactive recording medium and external server; converting a bit depth of at least a first image source to another bit depth so that the first image source has same bit depth as a second image source.

Converting the bid depth comprises increasing the bit depth to match a first value. The first value is approximately equal to a highest bit depth value chosen from among respective bit depths associated with each of the plurality of image sources. In one embodiment converting the bit depth comprises repeating a unit pixel value a predetermined number of times to increase the bit depth.

According to one or more embodiments, a color value of image data is repeated a predetermined number of times to increase the bit depth. The bit depth is increased within a range of approximately 2m to 2n, where $n > m \geq 0$, for example. The bit depth is increased by discarding at least one low-order bit of image data of the first image source. The low-order bit is discarded after at least a unit pixel or color value is repeated. In certain embodiments, the bit depth of the first image source is reduced to a target bit-conversion value, if the bit depth of the first image source is greater than a target value.

In accordance with another embodiment, a method for processing image data in an interactive media player comprises receiving a plurality of image sources, each image source associated with a respective bit depths; comparing at least one of the respective bit depths with a predetermined reference bit-depth; and converting the respective bit depth to another bit depth, if the respective bid depths is different from the predetermined reference bit-depth.

Converting the respective bid depth comprises increasing the bit depth to match a first value. The first value is approximately equal to the predetermined reference bit-depth. Converting the respective bit depth may also comprise repeating a unit pixel or color value a predetermined number of times to increase the bit depth. In certain embodiments, the respective bit depth is reduced to a target bit-conversion value, if the respective bit depth is greater than the target bit-conversion value.

In accordance with one embodiment, an interactive media player system comprises a storage unit for storing a plurality of image sources read from a recording medium, each image source having a respective bit depth; a decoder for decoding the plurality of image sources, confirming the respective bit depths of the image sources to determine whether or not the respective bit depths are to be converted to another bit depth; and a converter for converting at least one of the respective bit depths into another bit depth.

A mixer for mixing video data reproduced from the interactive recording medium and image data with a converted bit depth, may be also included in the system. The converter converts at least one of the respective bit depths to another bit depth when at least a first image source stored in the storage unit has a different bit depths than a second image source. In some embodiments, at least one of the respective bit depths to another bit depth when at least a first image source stored in the storage unit has a different bit depths than a reference bit depth. The converter may increase at least one of the respective bit depths by repeating a unit pixel or color value. The bit depth is increased in a range of approximately 2m to 2n.

In some embodiments, the converter increases at least one of the respective bit depths by discarding at least a low-order bit of the image data or the converter reduces at least one of the respective bit depths by discarding at least a low-order bit of the image data.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DESCRIPTION OF THE PREFERRED EMBODIMENTS

Figure 1:
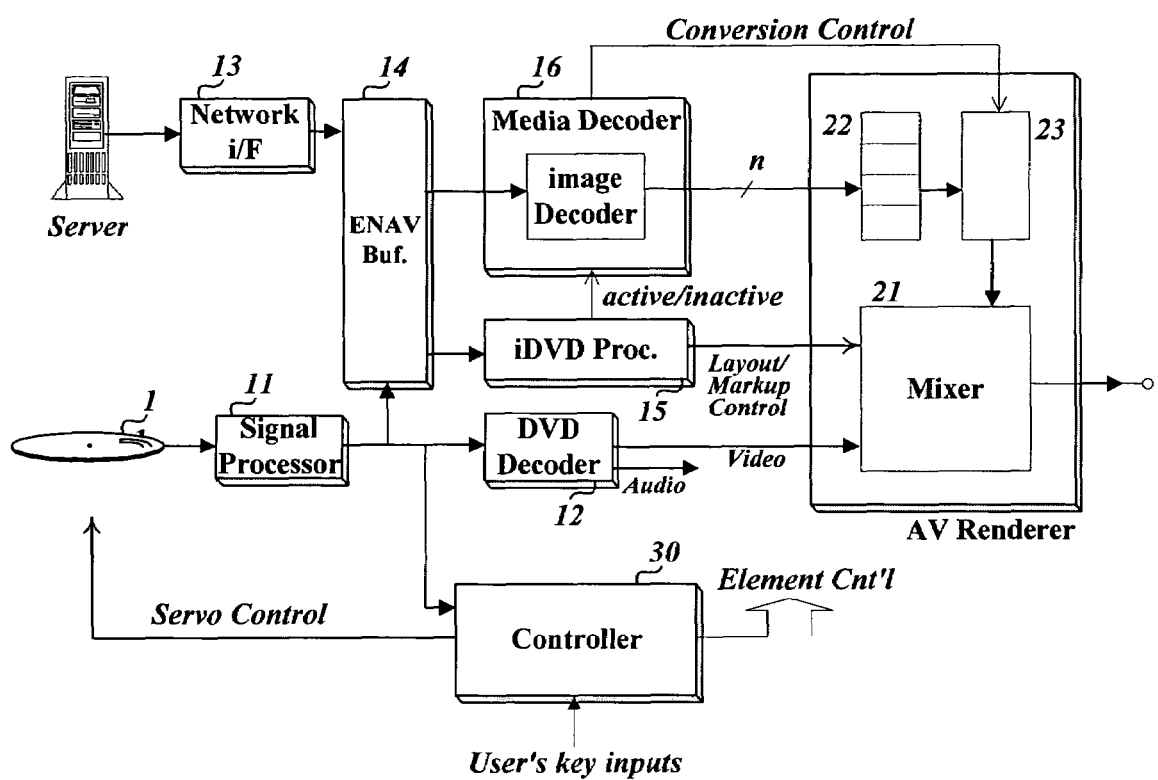
FIG. 1 is a block diagram illustrating an interactive media player for processing image data in accordance with one embodiment of the invention.

FIG. 1 is a block diagram illustrating an interactive media player adapted to an inventive apparatus and method for processing image data in accordance with the present invention. Referring to FIG. 1, the interactive media player includes: a signal processor 11 for reading signals recorded on an interactive recording medium seated in the player, processing the read signals, and restoring resultant signals into digital data; a DVD decoder 12 for decoding compressed A/V data generated from the signal processor 11.

Provided also is a network interface 13 for performing a network interface function, a web browser function; an ENAV buffer 14 for temporarily storing ENAV data therein; an iDVD processor 15 for interpreting a document such as an html text, and controlling a screen layout; and a media decoder 16 for decoding media data such as a compressed image or animation; a media buffer 22 for storing the decoded media data while being classified according to sources. The interactive media player further includes a bit converter 23 for equalizing different bit depths of image data stored in the media buffer 22, and forming predetermined uniform bit depths.

Some embodiments may also comprise a mixer 21 for receiving video data generated from the DVD decoder 12 and individual image data of more than one source generated from the bit converter 23, selecting output locations of the individual image data on the basis of layout control data of the iDVD processor 15, and controlling the image data to be displayed as video signals at the selected output locations; and a controller 30 for controlling user's key inputs, communications with external devices, and overall operations of the aforementioned components needed for reading the I-DVD being an interactive recording medium.

Figure 2:
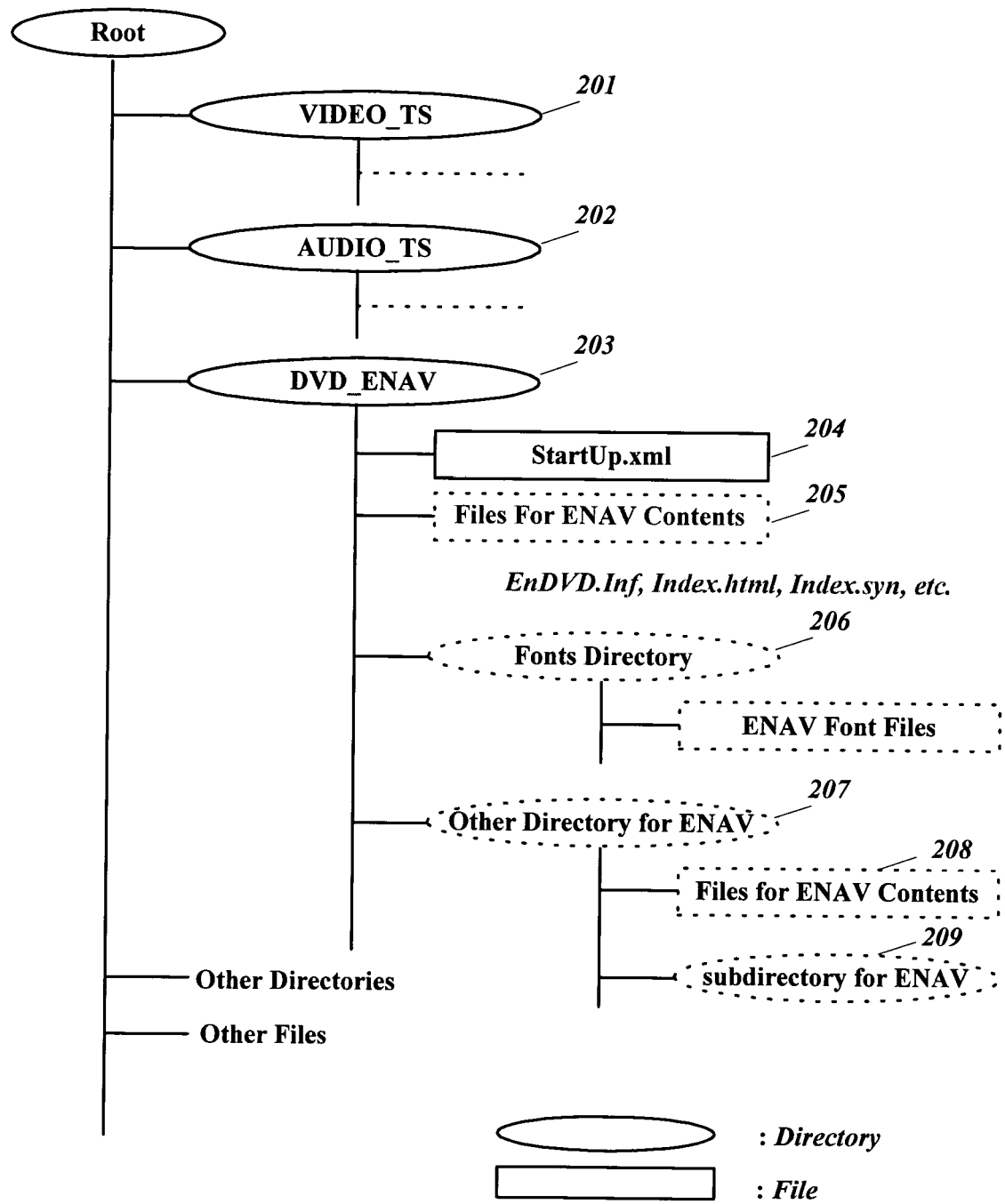
FIG. 2 is a directory structure of an interactive recording medium, in accordance with one embodiment of the invention.

A directory structure of the I-DVD 1 is as shown in FIG. 2. An additional contents directory "DVD_ENAV" 203 arranged under a root directory includes: a start-up file "StartUp.xml" 204 containing information for system environment setting to be necessarily performed before data of the I-DVD is reproduced; an information file "EnDVD.Inf" required for reproducing A/V data recorded on the I-DVD; an initial screen setup file "index.html" for playback; a synchronization file "index.syn" for the synchronization between data items of different attributes, etc. The directory "DVD_ENAV" 203 further includes a fonts directory 206 storing font files required for outputting a text of the additional contents; and an additional contents directory 207 containing the additional contents for providing additional A/V contents, i.e., ENAV data files 208. The additional contents directory 207 can include additional contents, e.g., subdirectories 209, on the basis of a hierarchical structure.

A video title set directory "Video_TS" 201 containing video data and an audio title set directory "Audio_TS" 202 containing audio data are arranged under the root directory. An item of disc version information associated with the I-DVD and an item of contents manufacturer information are recorded in the "EnDvd.inf" file of the directory 203. Further, uniform resource identifier (URI) information associated with a contents server for providing, through the Internet, the additional contents information relating to A/V data to be read and reproduced from the I-DVD can be recorded in the directory 203.

Items of setup information for the initial screen setting at a time of reproducing the data of the interactive DVD can be recorded in the setup file "index.html" of the directory 203. Items of time stamp information required for performing the synchronization between the A/V data and ENAV data to be read and reproduced from the I-DVD are recorded in the synchronization file "index.syn".

Moreover, before data of the I-DVD is reproduced, various information items for system environment setting to be necessarily performed are recorded in the start-up file "StartUp.xml". The various information items include: information of contents to be loaded in a memory before the playback; location information of a source for providing the contents information; information of a parental ID indicating a right to access the recorded A/V data; information of language of the additional contents; information of a web-site connection during the playback; memory management information; information of a file to be processed after the start-up file is processed; and information of a version of the start-up file, etc.

To reproduce data of the I-DVD 1 recording therein the aforementioned data, ENAV data serving as additional contents needs to be pre-loaded in the ENAV buffer 14. For this operation, the iDVD processor 15 read and interprets a start-up file "StartUp.xml" stored in the "DVD-ENAV" directory 203, confirms a parental ID as a level of a right to reproduce data of the I-DVD, a region code, etc., and sets up a requisite playback system state.

Then, the iDVD processor 15 confirms a version of a pre-loading list from the start-up file, and transmits the confirmed version information to a specified server through the network interface 13. Location information of the specified server can be confirmed from information designated in the start-up file or from URL information recorded in the "EnDvd.inf" file. A corresponding server receiving the version information transmits the preloading list of a latest version to the player if the latest version higher than the received version exists in the server. On the other hand, if the latest version higher than the received version does not exist, the corresponding server notifies the player of the fact that the received version is the latest version.

If the preloading list is downloaded through the network interface 13, the downloaded list is used as preloading information. If the preloading list is not downloaded, the preloading list contained in the start-up file is used as the preloading information. Contents recorded in the preloading list are referred to and necessary ENAV data (e.g., html files, image files, sound files, text files, etc.) is read from the interactive recording medium 1 or received from an external server, and then stored in the ENAV buffer 14.

If the ENAV data recorded in the preloading list is completely preloaded, the controller 30 begins to reproduce data of the interactive recording medium 1 seated in the player. If the controller 30 begins to reproduce data of the disc 1, then it rotates the seated interactive recording medium 1, the signal processor 11 reads signals recorded in the interactive recording medium 1, converts the read signals into digital data, and transmits the digital data to the DVD decoder 12. Then, the DVD decoder 12 decodes the received data using video and audio data, and transmits the decoded result to the mixer 12. The mixer 21 outputs the decoded video data as video signals according to an A/V data output window contained in a specified layout determined at the iDVD processor 15.

In the meantime, a method for processing image data according to a preferred embodiment of the present invention is also performed during the playback time of the above-identified A/V data.

The iDVD processor 15 reads files written in a mark-up language from ENAV data preloaded in the ENAV buffer 14 at step S10, interprets the read files, sets up a screen layout on the basis of the interpreted information, reads requisite files from the ENAV buffer 14 at step S10, and applies the requisite files to the media decoder 16.

In this case, the iDVD processor 15 recognizes the number of image sources (including not only images but also animation frames) to be outputted on the same display screen. If a plurality of image sources exist at step S11, the iDVD processor 15 controls the media decoder 16 to activate a data conversion. Then, the video decoder 16 compares bit depths for every pixel (under monochrome signals) or bit depths for every color at step S12. Individual image sources have the same internal configuration as in FIG. 4.

Individual bit depths for every pixel or color can be recognized from data values (e.g., 1, 2, 4 or 8) recorded in a "Bit Depth" field contained in an image header. For example, provided that a specified value "8" is recorded in the "Bit Depth" field according to the display method of RGB data, one pixel has a depth of 24 bits (i.e., the number of colors (3)×bit depths for every color (8)=24 bits).

If the recognized bit depths are different from each other, the media decoder 16 requests the bit converter 23 to perform a bit conversion operation. In this case, a bit depth and a bit-conversion target value of each image source are transmitted to the bit converter 23. Preferably, the target value is the same as the highest bit-depth of the image sources. For example, provided that bit depths for every color of three image sources are 2, 4, and 8, respectively, the target value transmitted to the bit converter 23 is to be "8".

Simultaneously with performing the bit conversion request and transmitting the bit-conversion target value, the media decoder 16 reads image or animation data, designated by the ENAV buffer 14, while being classified according to individual image sources, decodes the read image or animation data. Then, the read image or animation data is stored in the media buffer 22 while being classified according to fields.

The bit converter 23 refers to bit depths and bit-conversion target values of image sources received from the media decoder 16. If it is determined that any image source having the bit depth lower than the target value exists, the bit depth is increased according to the following method at step S13. In more detail, in the case of increasing the bit depth for every pixel or color, a predetermined value "K" is multiplied by a specified bit "X" to be increased, resulting in a target bit value "Y". Therefore, a prescribed value denoted by $$K\left(=\frac{2^n-1}{2^m-1}\right)$$

(where n=target bit depth, and m=bit depth to be converted) needs to be multiplied by a predetermined number to be converted.

Provided that a 4-bit value is increased to a 8-bit value, the above value "K" can be denoted by a specified number "10001". In this case, a resultant value of the multiplication between the value "K" denoted by "10001" and the 4-bit value "X" is identical with a repetition value "XX" (=Y) of the 4-bit value "X". Therefore, if the 4-bit value is increased to the 8-bit value, the 4-bit value needs to be repeated once to obtain the desired 8-bit value. Likewise, if a 2-bit value is converted to a 8-bit value, the value "K" is denoted by a binary number "1010101" so that it is necessary for the bit converter 23 to repeat the 2-bit value "X" four times to create a desired value "XXXX" (=Y).

However, if the bit depth is unable to be increased in the form of 1→2→4→8, for example, if a 6-bit value needs to be increased to a 8-bit value, the above-mentioned value "K" cannot be denoted by a natural number, such that it is impossible for the bit converter 23 to obtain the desired 8-bit value by means of the repetition of the 6-bit value. In this case, the 6-bit value needs to be repeated once to create a 12-bit value, and four low-order bits are then discarded, resulting in a desired 8-bit value.

The bit converter 23 sequentially increases bit depths of individual image data, stored in the media buffer 22 while being classified according to image sources, and at the same time outputs the increased bit depths of the image data to the mixer 21. Here, image data of the highest bit depth is only read without increasing its bit depth.

The mixer 21 receives data of individual image sources, and controls the data to be outputted at corresponding locations according to layout setup data received from the iDVD processor 15, thereby creating an image layer at step S14.

Figures 4, 5:
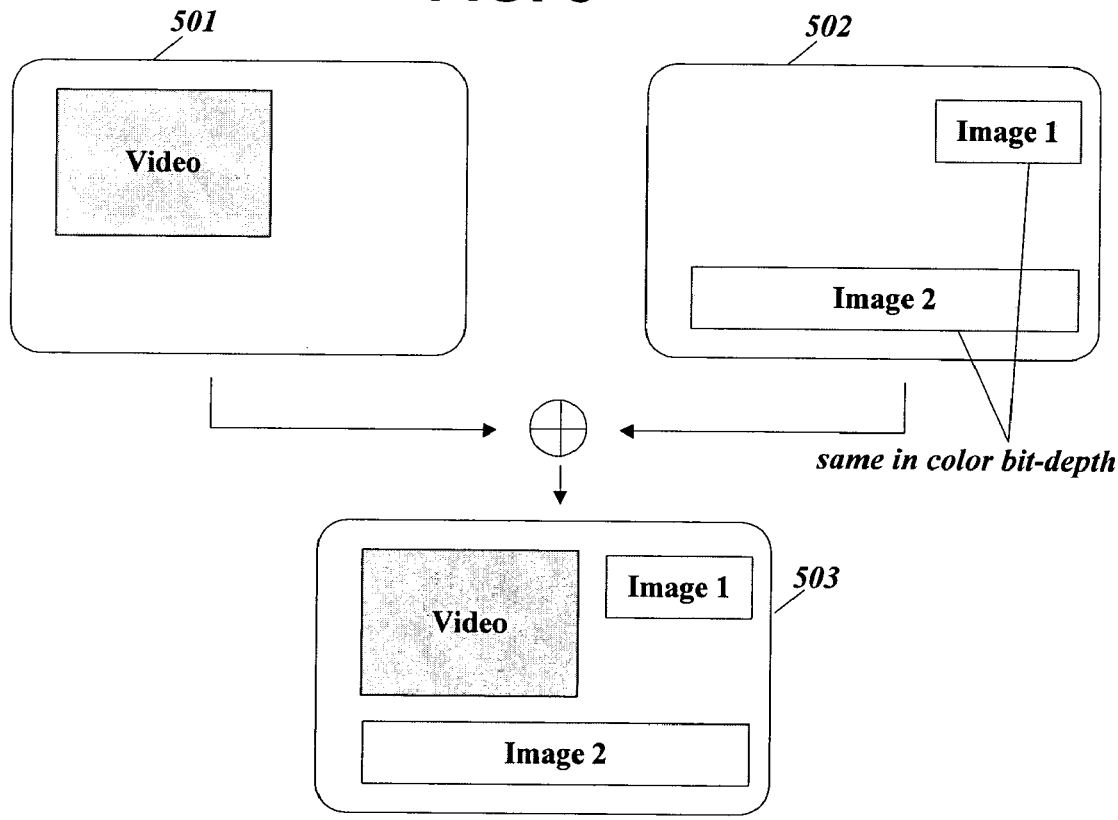
FIG. 4 is an exemplary table format of image sources containing image data in one or more embodiments.
FIG. 5 illustrates an exemplary case in which a video layer containing equalized images of the same bit depth is mixed with another image layer to form a display signal.

FIG. 5 illustrates a video layer 501 composed of one output window and an image layer 502 composed of two image windows according to the present invention. The mixer 21 creates the video layer 501 using video data received from the DVD decoder 12, creates the image layer 502, and mixes the video layer 501 and the image layer 502 in such a way that one output display screen 503 is completely formed at step S15. Therefore, a user can view moving picture data being reproduced and additional contents associated with the moving picture data at the same time.

In the case where input image sources respectively have a bit depth of a maximum 4-bit at a time of starting reproduction of their data, the bit converter 23 is preset to a predetermined function for increasing image data having 1 or 2 bit-depth. In this case, if a new input image source has a bit depth of 8 bits, the bit converter 23 reduces the bit depth of the input image source having the 8-bit bit depth. That is, the bit converter 23 removes low-order bits corresponding to a desired number of bits from the whole bit depth of 8 bits.

Figure 3A:
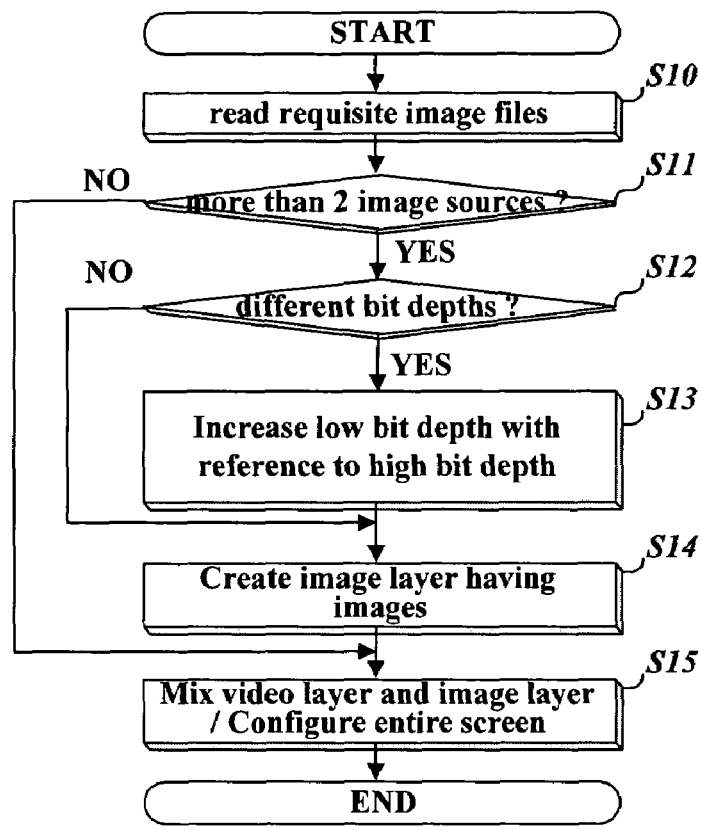
FIGS. 3a~3b are flowcharts illustrating one or more methods for processing image data in the interactive media player in accordance with one embodiment of the invention.
Figure 3B:
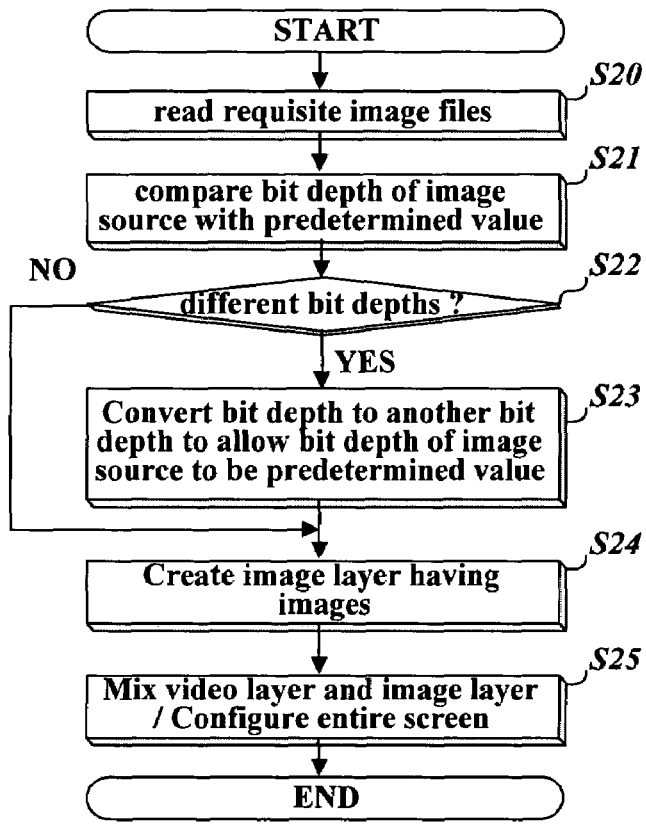

Such an image data conversion method can be performed differently from that of FIG. 3a. FIG. 3b illustrates a specified example in which bit depth of image data to be outputted is fixed using a hardware device, and bit depths of input image data are converted to a fixed bit depth.

The media decoder reads a bit depth of a media file from the ENAV buffer 14 at step S20, and compares the read bit depth of the media file with a bit depth of image data designed for the mixer 21 at step S21. If the read bit depth of the media file is different from the bit depth of image data designed for the mixer 21 at step S22, the media decoder 16 notifies the bit converter 23 of increase or reduction of a bit depth of a corresponding image source. If the read bit depth of the media file is identical with the bit depth of image data at step S22, the media decoder 16 bypasses data of the corresponding image source.

The bit converter 23 increases or reduces bit depths of image data contained in a corresponding field of the media buffer 22 allocated to a bit-conversion-requested image source at step S23, and then outputs the resultant data to the mixer 21.

For example, if the mixer 21 is designed to control and process image data having a specified bit depth of 8 bits, image data of a bit depth of 4 bits is repeated once to create 8-bit data, or another image data having a specified bit depth of 12-bit discards its low-order 4 bits to create the same 8-bit data.

Then, the image layer 502 is configured at step S24, and is then mixed with the video layer 501 (or video signal) at step S25, in the same way as in FIG. 3a.

As apparent from the above description, an apparatus and method for processing image data in an interactive media player according to the present invention can output a plurality of image data having different bit depths for every pixel or color on one display screen, resulting in efficiency of hardware design and reduction of production costs of an interactive media player.

It should also be understood that the programs, modules, processes, methods, and the like, described herein are but an exemplary implementation and are not related, or limited, to any particular computer, apparatus, or computer programming language. Rather, various types of general-purpose computing machines or devices may be used with logic code implemented in accordance with the teachings provided, herein. Further, the order in which the steps of the present method are performed is purely illustrative in nature. In fact, the steps can be performed in any order or in parallel, unless indicated otherwise by the present disclosure.

The method of the present invention may be performed in either hardware, software, or any combination thereof, as those terms are currently known in the art. In particular, the present method may be carried out by software, firmware, or macrocode operating on a computer or computers of any type. Additionally, software embodying the present invention may comprise computer instructions and be stored in a recording medium. (e.g., ROM, RAM, magnetic media, punched tape or card, compact disk (CD), DVD, etc.). Furthermore, such software may be transmitted in the form of a computer signal embodied in a carrier wave, or through communication networks by way of Internet websites, for example. Accordingly, the present invention is not limited to any particular platform, unless specifically stated otherwise in the present disclosure.

Thus, methods and systems for processing image data are provided. The present invention has been described above with reference to preferred embodiments. However, those skilled in the art will recognize that changes and modifications may be made in these preferred embodiments without departing from the scope of the present invention.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A method for processing image data in an interactive media player, the method comprising:
receiving first and second image sources from at least one of an interactive recoding medium including data to be reproduced by the interactive media player and an external server providing enhanced additional data to be reproduced by the interactive media player with the reproduced data from the interactive recording medium;
determining if said at least first and second image sources are to be output on a same display screen associated with the interactive media player;
determining if bit depths of frames included in the first and second image sources are different from each other when said at least first and second image sources are to be output on the same display screen;
selectively converting a bit depth of the frames of one of the first and second image sources to be the same as a bit depth of the frames of the other of the first and second image sources when the bit depths of the frames of the first and second image sources are different from each other, and not converting the bit depth of the frames of said one the first and second image sources when the bit depths of the frames of the first and second image sources are not different from each other; and
outputting the first and second image sources on the same display screen associated with the interactive media player.

2. The method as set forth in claim 1, wherein the step of selectively converting the bit depth comprises:
repeating a unit pixel value a predetermined number of times to increase the bit depth of the frames of said one of the first and second image sources.

3. The method as set forth in claim 1, wherein the step of selectively converting the bit depth comprises:
repeating a color value a predetermined number of times to increase the bit depth of the frames of said one of the first and second image sources.

4. The method as set forth in claim 1, wherein the bit depth of the frames of said one of the first and second image sources is increased within a range of approximately 2m to 2n, where $n>m \geqq 0$.

5. The method as set forth in claim 1, wherein the bit depth of the frames of said one of the first and second images sources is increased to be greater than the bit depth of the frames of the other of the first and second image sources and then decreased by discarding at least one low-order bit of image data of said one of the first and second image sources.

6. The method of claim 5, wherein the low-order bit is discarded after at least a unit pixel value is repeated.

7. The method of claim 5, wherein the low-order bit is discarded after at least a color value is repeated.

8. The method as set forth in claim 1, wherein the first and second image sources are received from 1) the interactive recording medium and external server, respectively, or 2) the external server and the interactive recording medium, respectively.

9. A method for processing image data in an interactive media player, the method comprising:
reading a first image file from an interactive recording medium including data to be reproduced by the interactive media player and a second image file from an external server that provides enhanced data to be reproduced by the interactive media player with the reproduced data from the interactive recording medium;
comparing a bit depth of frames of the second image file with a predetermined fixed bit depth used for processing frames of the first image file;
selectively converting the bit depth of the frames of the second image file to the predetermined fixed bit depth used for processing the frames of the first image file when the comparing step determines the bit depth of the frames of the second image file are different than the predetermined fixed bit depth used for processing the frames of the first image file, and not converting the bit depth of the frames of the second image file to the predetermined fixed bit depth used for processing the frames of the first image file when the comparing step determines the bit depth of the frames of the second image file are not different than the predetermined fixed bit depth used for processing the frames of the first image file; and
outputting the first and second image sources on a same display screen associated with the interactive media player.

10. The method as set forth in claim 9, wherein converting the respective bit depth comprises:
repeating a unit pixel value a predetermined number of times to increase the bit depth of the frames of the second image file.

11. The method as set forth in claim 9, wherein converting the bit depth comprises:
repeating a color value a predetermined number of times to increase the bit depth of the frames of the second image file.

12. The method as set forth in claim 9, wherein the bit depth of the frames of the second image file is increased within a range of approximately 2m to 2n, where $n>m\geq0$.

13. The method as set forth in claim 9, wherein the bit depth of the frames of the second image file is increased to be greater than the predetermined bit depth and then decreased by discarding at least one low-order bit in image data of the second image source.

14. The method of claim 13, wherein the low-order bit is discarded after at least one unit pixel value is repeated.

15. The method of claim 13, wherein the low-order bit is discarded after at least one color value is repeated.

16. An interactive media player system comprising:
a receiving unit configured to receive first and second image sources from at least one of an interactive recording medium including data to be reproduced by the interactive media player and an external server providing enhanced additional data to be reproduced by the interactive media player with the reproduced data from the interactive recording medium;
a control unit configure to determine if said at least first and second image sources are to be output on a same display screen associated with the interactive media player, and to determine if bit depths of frames included in the first and second image sources are different from each other when said at least first and second image sources are to be output on the same display screen;
a converter configured to selectively convert a bit depth of the frames of one of the first and second image sources to be the same as a bit depth of the frames of the other of the first and second image sources when the bit depths of the frames of the first and second image sources are different from each other, and not convert the bit depth of the frames of said one the first and second image sources when the bit depths of the frames of the first and second image sources are not different from each other; and
an outputting unit configured to output the first and second image sources on a same display screen associated with the interactive media player.

17. The system as set forth in claim 16, further comprising:
a mixer configured to mix the data reproduced from the interactive recording medium and the data with a converted bit depth.

18. The system as set forth in claim 16, wherein the converter is further configured to increase the bit depth of the frames of said one of the first and second image sources by repeating a unit pixel value.

19. The system as set forth in claim 16, wherein the converter is further configured to increase the bit depth of the frames of said one of the first and second image sources by repeating one color value of image data.

20. The system as set forth in claim 19, wherein the bit depth of the frames of said one of the first and second image sources is increased in a range of approximately 2m to 2n.

21. The system as set forth in claim 19, wherein $n>m\geq0$.

22. The system as set forth in claim 16, wherein the converter is further configured to increase the bit depth of the frames of said one of the first and second image sources to be greater than the bit depth of the frames of the other of the first and second image sources and then to decrease by discarding at least a low-order bit of image data.

23. The system as set forth in claim 16, wherein the first and second image sources are received from 1) the interactive recording medium and external server, respectively, or 2) the external server and the interactive recording medium, respectively.

* * * * *